Feb. 14, 1950 R. L. STEVENSON 2,497,102
COVER LATCH FOR AUTOMOBILE BAGGAGE COMPARTMENTS
Filed Nov. 1, 1948 2 Sheets-Sheet 1

INVENTOR,
Robert L. Stevenson.
BY Roy E. Hamilton,
Attorney.

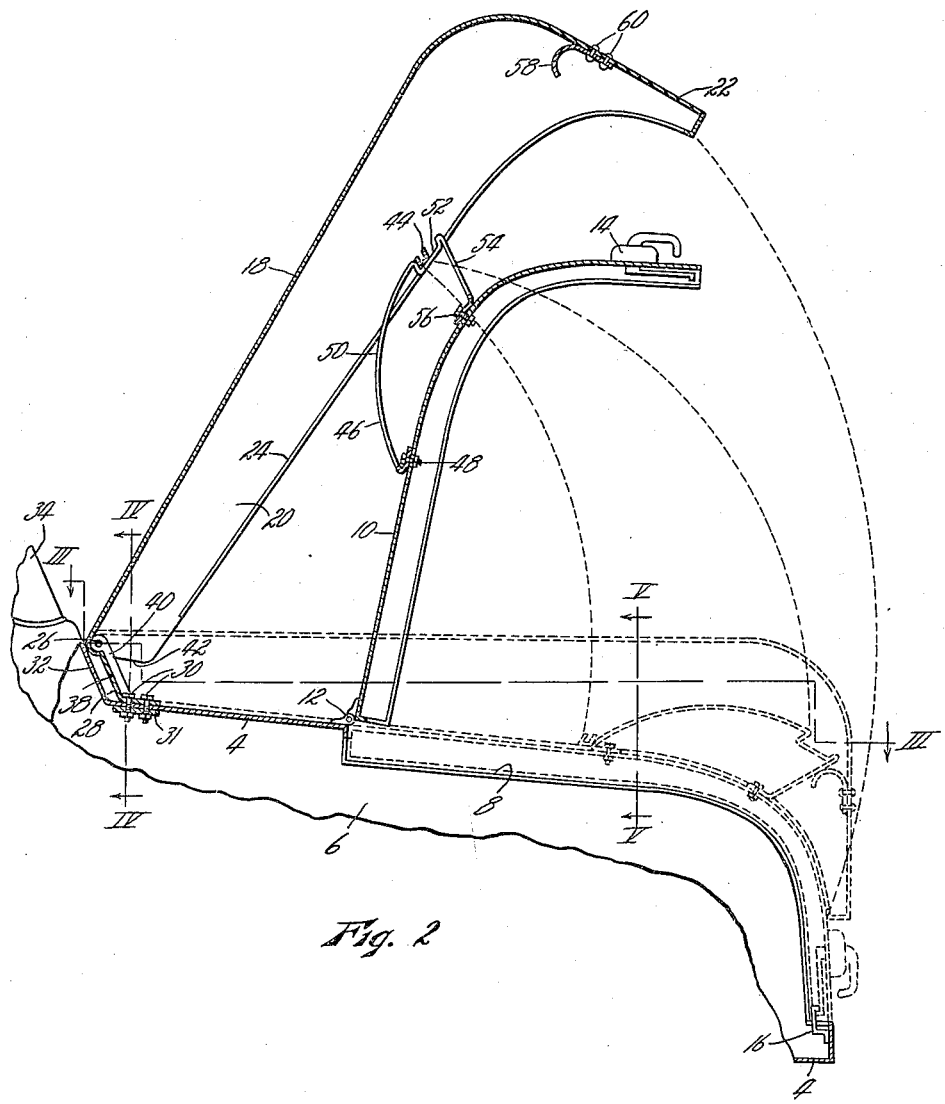

Patented Feb. 14, 1950

2,497,102

UNITED STATES PATENT OFFICE 2,497,102

COVER LATCH FOR AUTOMOBILE BAGGAGE COMPARTMENTS

Robert Louis Stevenson, Overland Park, Kans.

Application November 1, 1948, Serial No. 57,697

8 Claims. (Cl. 217—60)

1

This invention relates to new and useful improvements in cover latches for automobile baggage compartments, and relates particularly to latches for securing automobile baggage compartment covers in the open position.

The principal object of the present invention is the provision of a cover latch of the class described adapted to be positioned entirely outside of the baggage compartment, thereby increasing the usable space within said compartment. Latches in common use are disposed within the baggage compartment and occupy a portion thereof, thereby decreasing the usable space therein.

Another object is the provision of a cover latch of the class described wherein the parts thereof are firmly secured against rattling when in the inoperative position.

Other objects are simplicity and economy of construction, ease and dependability of operation, and beauty of apperance.

With these objects in view, as well as other objects, which will appear in the course of the specification, reference will be had to the drawings, wherein:

Fig. 2 is an enlarged fragmentary vertical longitudinal section of the rearward portion of the automobile, showing the baggage compartment cover, latch, and associated parts.

Figure 1:
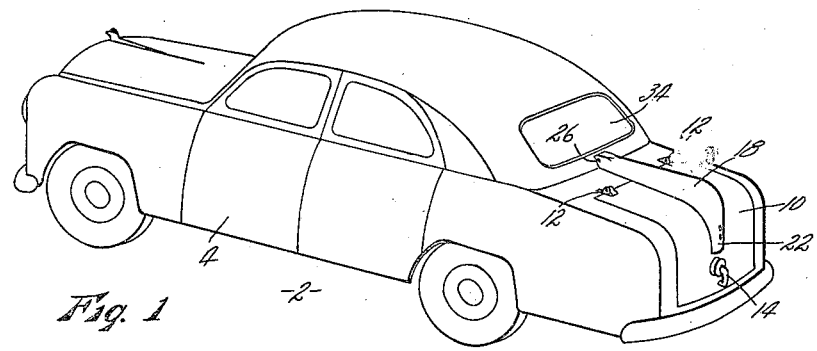
Figure 1 is a perspective view of an automobile, showing a baggage compartment cover latch embodying the present invention attached thereto.

Like reference numerals apply to similar parts throughout the several views, and the numeral 2 applies to an automobile having a body 4 enclosing within its rearward portion the usual baggage compartment 6. Said baggage compartment is accessible through an opening 8 formed in the body, and said opening is provided with a cover, or lid 10, connected at its forward edge with body 4 by means of hinges 12. Adjacent its rearward edge, which is usually downwardly curved, cover 10 is provided with a lock mechanism 14 adapted to engage a keeper 16 carried by car body 4 at the rearward edge of opening 8, thereby securing said cover in its closed position. Said lock mechanism may be of any suitable type in common use, and is therefore not shown here in detail.

2

Figures 4, 5:
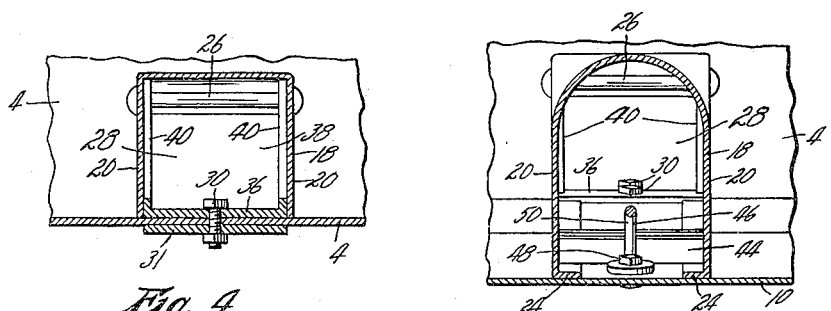
Fig. 4 is an enlarged fragmentary section taken on line IV—IV of Fig. 2 with the cover closed.
Fig. 5 is an enlarged fragmentary section taken on line V—V of Fig. 2 with the cover closed.

The latch for securing cover 10 in the open position includes an arm 18 formed preferably of sheet metal and having in cross-section a substantially inverted U-form, as best shown in Fig. 5, thus presenting side walls 20. Forming the arm in this manner provides good strength and rigidity with a minimum of weight, and provides a hollow interior within which the latch parts are normally concealed. Said arm is disposed longitudinally of the automobile, and is adapted to overlie the outer surface of cover 10 and the surface of car body 4 immediately forward of said cover, as shown in Figs. 1 and 2. Said arm is provided at its rearward end with a downward extension 22, and the lower edges of side walls 20 are shaped to conform with the contour of the cover and adjacent portion of the car body, and are provided with inwardly turned flanges 24 to provide broad contact therewith.

Figure 3:
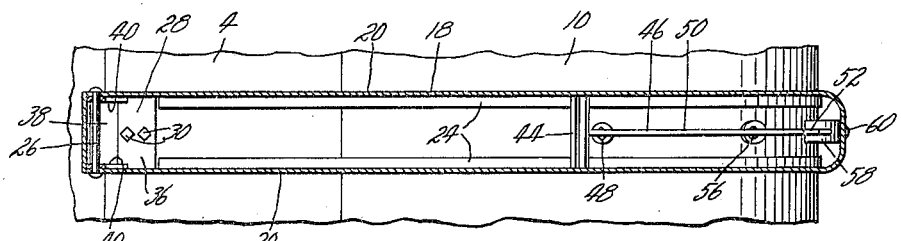
Fig. 3 is a fragmentary section taken on line III—III of Fig. 2, with the cover closed.

At its forward end arm 18 is pivotally connected by a pin 26 to a bracket 28 for movement in a vertical plane. Said bracket is fixed by means of bolts 30 to car body 4 in forwardly spaced relation from the axis of hinges 12 and adjacent the inclined portion 32 of body 4 which carries the usual rear window 34. Said bracket is unitary and comprises a plate 36 adapted to lie against body 4 and be secured thereto by bolts 30, an inclined plate 38 parallel to body portion 32, and rearwardly turned flanges 40 along the edges of inclined portion 38. Said flanges fit slidably against the inner surfaces of side walls 20 of arm 18, thus tending to seal the open forward end of arm 18 against the entry of water. Pivot pin 26 passes through flanges 40 adjacent their upper ends, and through side walls 20. The forward edges 42 of side walls 20 are shaped to conform to car body portion 32 when said arm is lowered, thus presenting a neat appearance. A reinforcing plate 31 may be placed against the inner surface of body 4 to receive bolts 30. A latch bar 44 extends transversely between side walls 20 of arm 18, being welded or otherwise fixed to flanges 24 of said side walls. As shown in Figs. 2 and 3, said latch bar is disposed substantially to the rear of the axis of hinges 12 when arm 18 is in its lowered position. Both the front and rear faces of said latch bar are upwardly and rearwardly inclined, for reasons hereinafter appearing.

Arm 18 is engaged and moved by an operating rod 46 carried by cover 10. As best shown in Fig. 2, said rod is secured at its forward end to the outer surface of cover 10 just forwardly of the position taken by latch bar 44 when arm 18 is lowered by means of bolt 48, and is adapted to contact the inclined rearward face of said latch bar as shown in dotted lines. Rod 46 extends upwardly and rearwardly to form an arcuate guide portion 50. Adjacent the rearward end of said guide portion, a portion of said rod is offset inwardly to form a notch 52, and from thence portion 54 of said rod extends forwardly and downwardly being secured at its lower end to cover 10 by means of bolt 56. Portion 54 is adapted to engage the upper surface of a leaf spring 58 secured to the inner surface of the downward projecting 22 of arm 18 by rivets 60 or other suitable means, and to compress said spring to urge arm 18 firmly against cover 10. Operating rod 46 is sufficiently heavy to be substantially rigid, and lies entirely in a vertical plane, whereby it is adapted to project into arm 18 through the open side thereof.

The operation of the latch is substantially as follows: With the cover 10 closed, as shown in dotted lines in Fig. 2, lock mechanism 14 is released and the cover is raised in the usual manner. Since hinges 12 supporting the cover and pivot pin 26 carrying arm 18 are horizontally spaced apart, latch bar 44 and operating rod 46 move in converging arcs, as shown by the directional lines in Fig. 2, and latch bar 44 moves upwardly and rearwardly along guide portion 50 of operating rod 46, and arm 18 is pivoted upwardly thereby. Since guide 50 curves away from cover 10, a quick separation of arm 18 from the cover is thus effected, which permits the cover and arm to pivot freely without interference with each other. It will be noted that downward extension 22 of arm 18 does not extend so far around the downward curve of cover 10 as to cause any binding therebetween as the opening motion is started. When cover 10 has been opened far enough to bring latch bar 44 even with notch 52 of operating rod 46, arm 18 will drop by gravity to move said latch bar into said notch. Cover 10 may then be released, and as said cover and arm 18 pivot slightly downwardly by gravity, latch bar 44 will be moved toward the forward end of notch 52, the inclined forward face thereof engaging the correspondingly inclined forward portion of said notch to prevent accidental disengagement of said bar from said notch. If it is attempted to open the cover still farther, operating bar 44 will strike rod 46 at the rearward end of notch 52. The cover is then firmly latched in the open position, as shown in solid lines in Fig. 2.

When it is desired to close the cover, the cover is first pivoted upwardly slightly to disengage the inclined forward faces of latch bar 44 and notch 52, and arm 18 is then pivoted slightly upwardly to move said latch bar out of said notch. Said cover and said arm may then be pivoted downwardly together, latch bar 44 riding slidably along guide portion 50 of rod 46. As the cover approaches its closed position, portion 54 of rod 46 will contact the upper surface of string 58, and during the final closing movement of said cover said spring will be compressed, thus urging arm 18 firmly against cover 10 to prevent rattling or vibration.

Thus a cover latch having several advantages has been produced. It is extremely simple in construction and operation, and therefore not likely to get out of order. It is disposed entirely outside of the luggage compartment of the automobile, thereby permitting effective use of the entire volume of said compartment. All of the latch parts are normally contained in and concealed by a hollow arm, which may be externally shaped to blend with and further enhance the artistic design of the automobile. The specific shape of arm 18 is of course immaterial so long as it will contain rod 46 and has a pivot properly positioned relative to the cover hinges. Ordinarily it is deemed preferable that said arm should have a rounded, streamlined appearance as shown. Also the latch may easily be adapted to fit virtually any automobile body type having a rear luggage compartment. It is contemplated that these and other minor variations of construction and operation could be made without departing from the spirit of the invention.

What I claim is:

1. The combination, with an automobile having a luggage compartment and a cover for said luggage compartment hingeably secured to the body of said automobile, of a latch for securing said cover in the open position comprising a member having an outwardly opening notch formed therein fixed to the outer surface of said cover in spaced relation from the pivotal axis thereof, and a latch bar carried for pivotal movement by said automobile body, about an axis spaced oppositely from said cover axis and parallel thereto, whereby as said cover and latch bar are pivotally raised, said latch bar and notched member move in converging arcs and said latch bar will be engaged in said notch.

2. The combination, with an automobile having a luggage compartment and a generally upwardly opening cover for said luggage compartment hingeably secured to the body of said automobile, of a latch for securing said cover in the open position comprising a member having an outwardly opening notch formed therein fixed to the outer surface of said cover in spaced relation from the pivotal axis thereof, and a latch bar carried for pivotal movement by said automobile body about an axis spaced oppositely from said cover axis and parallel thereto, whereby as said cover and latch bar are pivotally raised, said latch bar and notched member move in converging arcs and said latch bar will drop into said notch by gravity.

3. The combination, with an automobile having a luggage compartment and a generally upwardly opening cover for said luggage compartment hingeably secured to the body of said automobile, of a latch for securing said cover in the open position comprising an operating member fixed to the outer surface of said cover in spaced relation to the pivotal axis of said cover, said operating member having a surface inclined outwardly from the surface of said cover in the direction of the free edge of said cover and a notch formed at the outer end of said incline, and a latch bar carried for pivotal movement by said automobile body about an axis parallel to and spaced apart from said cover axis, said latch bar being adapted to contact said operating member adjacent the lower end of the inclined portion thereof when said cover is closed, whereby as said cover is raised, said latch bar will be moved slidably upwardly along the inclined operating member and will drop into the notch thereof by gravity.

4. The combination, with an automobile having a luggage compartment and a generally upwardly opening cover for said compartment hingeably secured at its forward edge to the body of said automobile, of a latch for securing said cover in the open position comprising a hollow arm pivoted at its forward end to said automobile body in spaced relation to the pivotal axis of said cover, for movement about an axis parallel to said cover axis, said arm being adapted to overlie a portion of the outer surface of said cover and having its lower side open; a latch bar carried rigidly in said arm in rearwardly spaced relation from said cover axis; and an operating member fixed to the outer surface of said cover and normally projecting into said hollow arm, said operating member having a surface inclined outwardly from said cover toward the free edge of said cover and having a notch formed at the outer end of said inclined portion, said latch bar being so positioned as to contact the inclined portion of said operating member adjacent the lower end thereof when said cover is closed.

5. The combination, with an automobile having a luggage compartment and a generally upwardly opening cover for said compartment hingeably secured at its forward edge to the body of said automobile, of a latch for securing said cover in the open position comprising an arm pivoted at its forward end to said automobile body in forwardly spaced relation to the pivotal axis of said cover for movement about an axis parallel to said cover axis, said arm being adapted to overlie a portion of the outer surface of said cover and shaped to conform with the contours thereof; a transverse latch bar carried by said arm intermediate its ends; an operating member fixed to said cover and having a notch formed therein adapted to lie engaged by said latch bar when said cover is raised; and means for resiliently urging said arm against said cover when said cover is closed.

6. The combination, with an automobile having a luggage compartment and a generally upwardly opening cover for said compartment hingeably secured at its forward edge to the body of said automobile, of a latch for securing said cover in the open position comprising an arm pivoted at its forward end to said automobile body in forwardly spaced relation to the pivotal axis of said cover for movement about an axis parallel to said cover axis, said arm being adapted to overlie a portion of the outer surface of said cover and shaped to conform with the contours thereof; a transverse latch bar carried by said arm intermediate its ends; an operating member fixed to said cover and having a notch formed therein adapted to lie engaged by said latch bar when said cover is raised; a spring carried by said arm adjacent the outer end thereof; and a member carried by said cover and adapted to contact and compress said spring as said cover is moved to its closed position, whereby said arm is firmly urged against said cover.

7. The combination, with an automobile having a luggage compartment and a generally upwardly opening cover for said compartment hingeably secured at its forward edge to the body of said automobile, of a latch for securing said cover in the open position comprising an arm pivoted at its forward end to said automobile body in forwardly spaced relation to the pivotal axis of said cover for movement about an axis parallel to said cover axis, said arm being adapted to overlie a portion of the outer surface of said cover and shaped to conform with the contours thereof, a transverse latch bar carried by said arm intermediate its ends, and normally spaced rearwardly from said cover axis; an operating member secured to said cover, said operating member comprising a length of rigid material secured at its ends to said cover and shaped to present an arcuate guide portion inclined outwardly and rearwardly from said cover, a notch at the rearward end of said guide portion, and a spring-actuating portion inclined downwardly and forwardly from the rearward end of said notch, said latch bar contacting said guide portion adjacent the forward end thereof when said cover is closed; and a spring carried by said arm adjacent its free end and adapted to be contacted and downwardly compressed by the spring-actuating portion of said operating member as said cover is closed.

8. The combination, with an automobile having a luggage compartment and a generally upwardly opening cover for said compartment hingeably secured at its forward edge to the body of said automobile, of a latch for securing said cover in the open position comprising a hollow arm pivoted at its forward end to said automobile body in spaced relation to the pivotal axis of said cover, for movement about an axis parallel to said cover axis, said arm being adapted to overlie a portion of the outer surface of said cover and having its lower side open; a latch bar carried rigidly in said arm in rearwardly spaced relation from said cover axis; an operating member fixed to the outer surface of said cover and normally projecting into said hollow arm, said operating member comprising a length of rigid material secured at its ends to said cover and shaped to present an arcuate guide portion inclined outwardly and rearwardly from said cover, a notch at the rearward end of said guide portion, and a spring-actuating portion inclined downwardly and forwardly from the rearward end of said notch, said latch bar contacting said guide portion adjacent the forward end thereof when said cover is closed; and a spring fixed to the inner surface of said arm adjacent its free end and adapted to be contacted and downwardly compressed by the spring-actuating portion of said operating member as said cover is closed.

ROBERT LOUIS STEVENSON.

No references cited.